(12) United States Patent
Lee et al.

(10) Patent No.: US 7,022,199 B2
(45) Date of Patent: Apr. 4, 2006

(54) METHOD FOR FABRICATING LCD

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 209 days.

(21) Appl. No.: 10/184,083

(22) Filed: Jun. 28, 2002

(65) Prior Publication Data

US 2003/0145944 A1 Aug. 7, 2003

(30) Foreign Application Priority Data

Feb. 6, 2002 (KR) .......................................... 2002-6656

(51) Int. Cl.
*G02F 1/13* (2006.01)

(52) U.S. Cl. .................... 156/106; 156/273.1; 156/285; 156/312; 349/187; 349/190

(58) Field of Classification Search .................... 156/99, 156/106, 273.1, 285, 312; 349/187, 190, 349/191
See application file for complete search history.

(56) References Cited

U.S. PATENT DOCUMENTS

| | | | |
|---|---|---|---|
| 3,978,580 A | | 9/1976 | Leupp et al. |
| 4,094,058 A | | 6/1978 | Yasutake et al. |
| 4,653,864 A | | 3/1987 | Baron et al. |
| 4,691,995 A | | 9/1987 | Yamazaki et al. |
| 4,775,225 A | | 10/1988 | Tsuboyama et al. |
| 5,247,377 A | | 9/1993 | Omeis et al. |
| 5,263,888 A | * | 11/1993 | Ishihara et al. ................ 445/25 |
| 5,379,139 A | | 1/1995 | Sato et al. |
| 5,406,989 A | | 4/1995 | Abe |
| 5,464,715 A | * | 11/1995 | Nishi et al. .................... 430/22 |

(Continued)

FOREIGN PATENT DOCUMENTS

| | | |
|---|---|---|
| EP | 1003066 A1 | 5/2000 |
| JP | 51-065656 | 6/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06-235925 | 8/1994 |
| JP | 06265915 | 9/1994 |

(Continued)

*Primary Examiner*—John T. Haran
(74) *Attorney, Agent, or Firm*—McKenna Long & Aldridge LLP (57) ABSTRACT

A method for fabricating an LCD includes the steps of loading a first substrate having liquid crystal dropped thereon and a second substrate having sealant coated thereon on a bonding chamber, aligning the first and second substrates, bonding the first and second substrates with a varied pressure applied thereto, and unloading the bonded first and second substrates.

21 Claims, 11 Drawing Sheets

U.S. PATENT DOCUMENTS

| | | | |
|---|---|---|---|
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,222,603 B1 * | 4/2001 | Sakai et al. | 349/153 |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,646,689 B1 * | 11/2003 | Matsuda | 349/1 |
| 2001/0021000 A1 | 9/2001 | Egami | |
| 2003/0067581 A1 * | 4/2003 | Lee et al. | 349/187 |
| 2003/0145943 A1 * | 8/2003 | Lee et al. | 156/285 |
| 2003/0147039 A1 * | 8/2003 | Lee et al. | 349/187 |
| 2003/0160935 A1 * | 8/2003 | Lee et al. | 349/187 |

FOREIGN PATENT DOCUMENTS

| | | |
|---|---|---|
| JP | 06-313870 | 11/1994 |
| JP | 07-084268 | 3/1995 |
| JP | 07128674 | 5/1995 |
| JP | 07181507 | 7/1995 |
| JP | 08095066 | 4/1996 |
| JP | 08-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 2000-147528 A | 5/2000 |
| JP | 3000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KR | 2000-0035302 A1 | 6/2000 |
| KR | 2002-76691 A | 10/2002 |

* cited by examiner

METHOD FOR FABRICATING LCD

The present invention claims the benefit of the Korean Application No. P2002-6656 filed on Feb. 6, 2002, which is hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a method for fabricating an LCD incorporating a liquid crystal dispensing method.

2. Discussion of the Related Art

In general, recent developments in the information communication field have increased demand for various types of display devices. In response to this demand, various flat panel displays such as liquid crystal display (LCD), plasma display panel (PDP), electro luminescent display (ELD), and vacuum fluorescent display (VFD) have been developed, some of which have been employed as displays in various products.

LCDs have been used most widely as mobile displays while replacing the CRT (Cathode Ray Tube) because of features and advantages including excellent picture quality, light weight, thin profile, and low power consumption. In addition to the mobile type LCDs, such as a display for a notebook computer, LCDs have been developed for computer monitors and televisions to receive and display broadcasting signals.

Despite various technical developments in LCD technology, research towards enhancement of LCD picture display quality has been, in some respects, lacking as compared to other components and characteristics of the LCD. Therefore, to use the LCD in various fields as a general display, the key to developing the LCD lies on whether the LCD can implement a high quality picture, such as high resolution, high luminance, and large-sized screen while still maintaining lightweight, thin profile, and low power consumption.

LCDs may be provided with a liquid crystal panel for displaying a picture, and a driving part for applying a driving signal to the liquid crystal panel. The liquid crystal panel has first and second glass substrates bonded together with a gap between the substrates. A liquid crystal layer is formed by injecting liquid crystal between the first and second glass substrates.

On the first glass substrate (a TFT array substrate, for example), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines arranged in a matrix, a plurality of thin film transistors switchable in response to a signal on the gate lines for transmission of a signal on the data line to the pixel electrodes.

The second glass substrate (a color filter substrate) has a black matrix layer for shielding light from areas excluding the pixel regions, R, G, B color filter layer, and a common electrode for implementing a picture.

The foregoing first and second substrates have a gap between them which is maintained by spacers and are bonded to one another by a sealant. The seal has a liquid crystal injection inlet through which the liquid crystal is injected after the two substrates are bonded and sealed.

After the individual liquid crystal display panels are cut, the space between the bonded two substrates of each LCD panel is evacuated and the liquid crystal injection inlet is dipped in a liquid crystal bath, so that the liquid crystal is injected into the space by a capillary tube phenomenon. Once the liquid crystal is injected into the space between the two substrates, the liquid crystal injection inlet is sealed by the sealant.

However, the related art method for fabricating an LCD having liquid crystal injected therein has the following problems. First, the related art method has a poor productivity because the dipping of the liquid crystal injection inlet in a liquid crystal bath while the space between the two substrates are maintained at a vacuum after the unit panels are cut into individual pieces for injection of the liquid crystal takes much time. Second, the liquid crystal injection for a large LCD, in particular, may cause imperfect filling of the liquid crystal in the panel, which may result in a defective panel. Third, the complicated and lengthy fabrication process requires the use of many liquid crystal injection devices, which occupies much space.

Accordingly, a method for fabricating an LCD by using a liquid crystal dropping method has been under research recently. A Japanese laid-open patent publication No. 2000-147528 discloses the following liquid crystal dropping method.

A related art method for fabricating an LCD by using the foregoing liquid crystal dropping method will be explained. FIGS. 1A–1F illustrate steps of a related art method for fabricating an LCD.

Figure 1A:
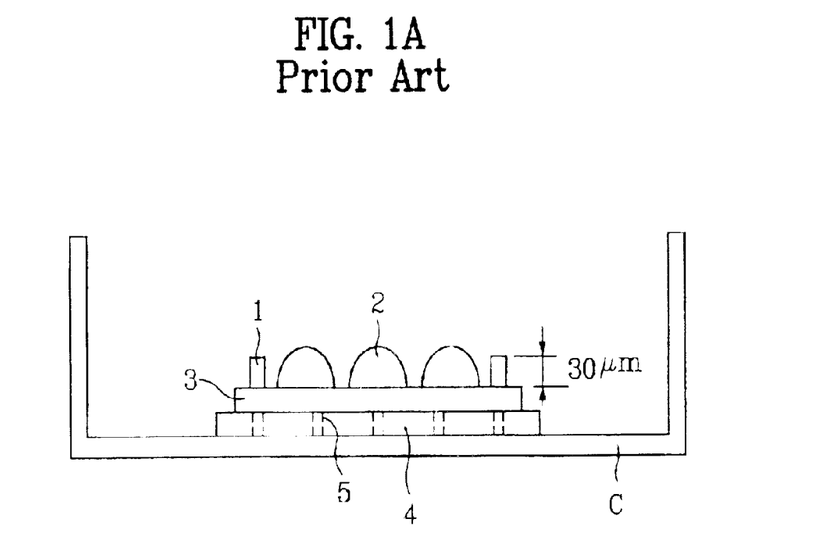
FIGS. 1A–1F schematically illustrate steps of a related art method for fabricating an LCD incorporating a liquid crystal dispensing method.

Referring to FIG. 1A, UV sealant 1 is coated on a first glass substrate 3 having a thin film transistor array formed thereon to a thickness of approximately 30μm, and liquid crystal 2 is dropped on an interior of the sealant 1, which is the thin film transistor array part. No liquid crystal injection inlet is provided in the sealant 1.

The first glass substrate 3 is mounted on a table 4 in a vacuum container 'C' which is movable in a horizontal direction, and held by vacuum on the bottom surface of the first glass substrate 3 by a first plurality of vacuum holes 5.

Figure 1B:
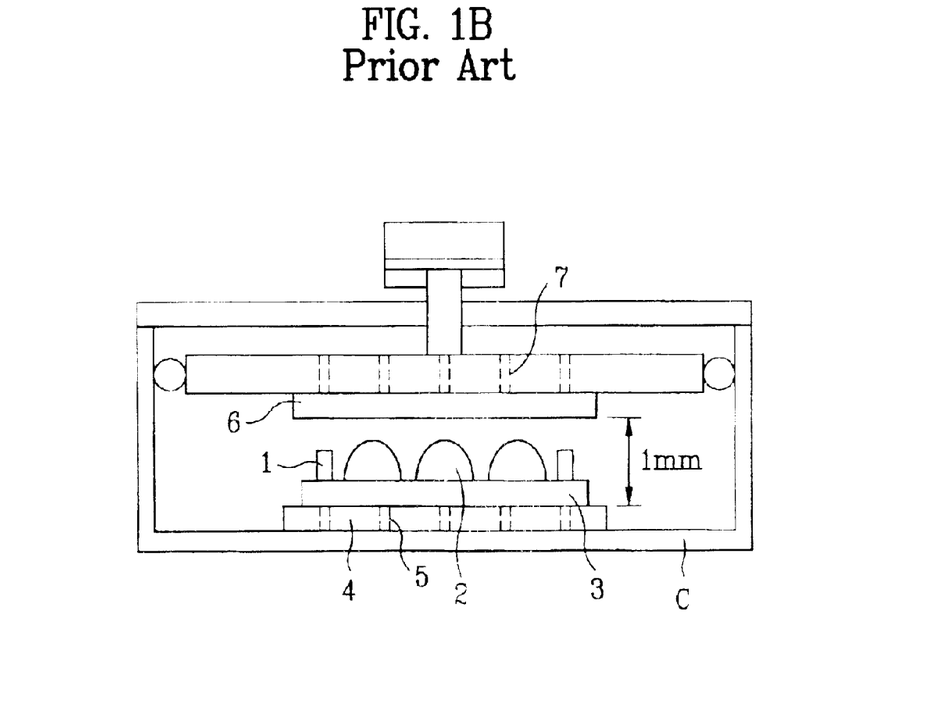

Referring to FIG. 1B, the bottom surface of the second glass substrate 6 having a color filter array formed thereon is held by vacuum using a second plurality of vacuum holes 7. The vacuum container 'C' is closed and evacuated. The second glass substrate 7 is moved downward in a vertical direction until a gap between the first substrate 3 and second glass substrate 6 is 1 mm. The table 4 with supporting first glass substrate 3 thereon is moved in a horizontal direction to pre-align the first and second glass substrates 3 and 6 with respect to each other.

Figure 1C:
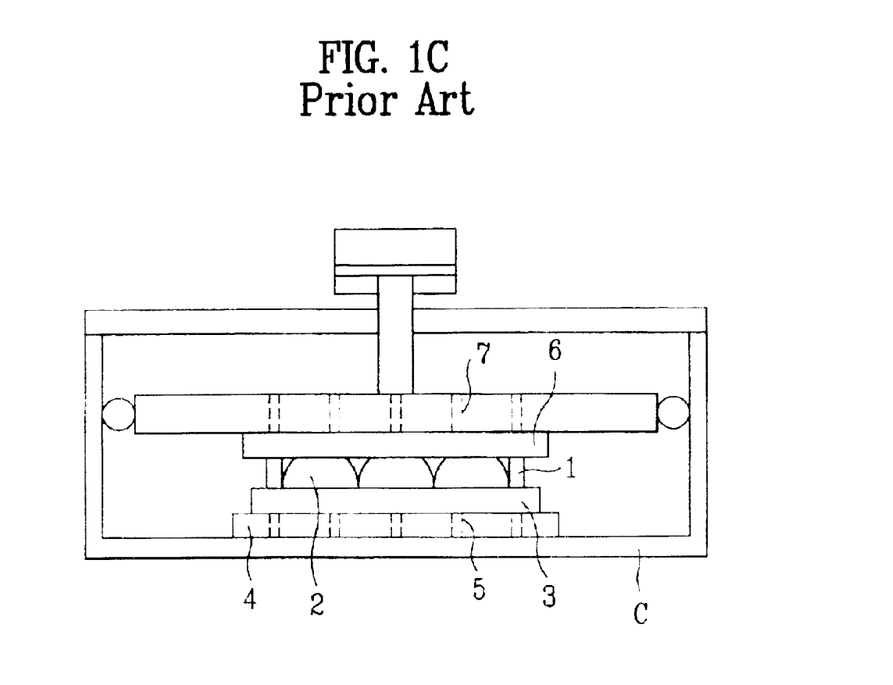
Figure 1D:
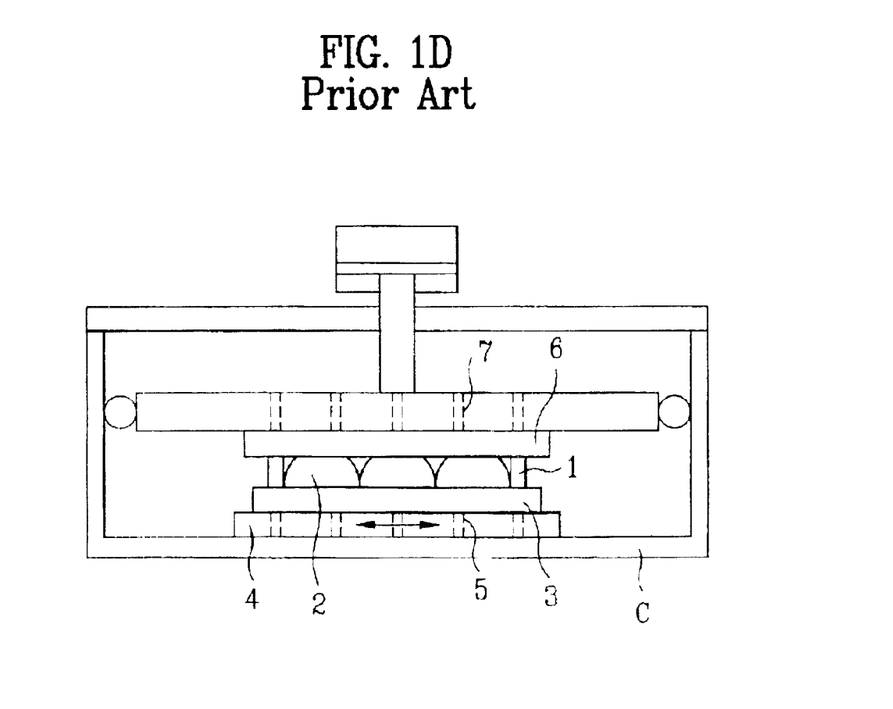
Figure 1E:
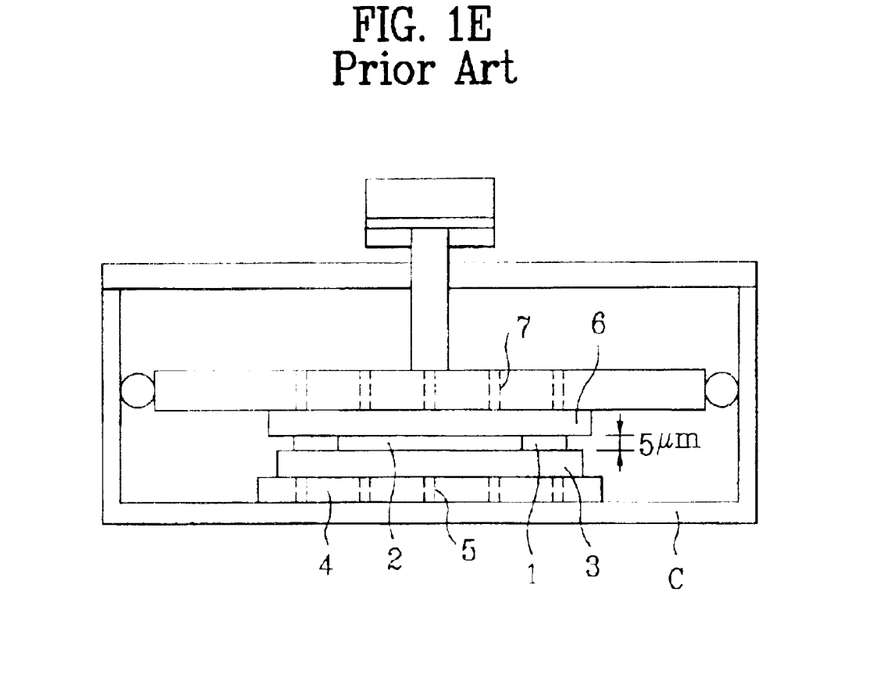

Referring to FIG. 1C, the second glass substrate 6 is moved downward until the second glass substrate 6 comes into contact with the liquid crystal 2 or the sealant 1. Referring to FIG. 1D, the table 4 with the first glass substrate 3 thereon is moved in a horizontal direction to align the first and second glass substrates 3 and 6. Referring to FIG. 1E, the second glass substrate 6 is moved further down until the second glass substrate 6 bonds with the first glass substrate 3 through the sealant 1. The second glass substrate 6 is pressed down further until the gap between the second glass substrate 6 and the first glass substrate 3 becomes 5 m.

Figure 1F:
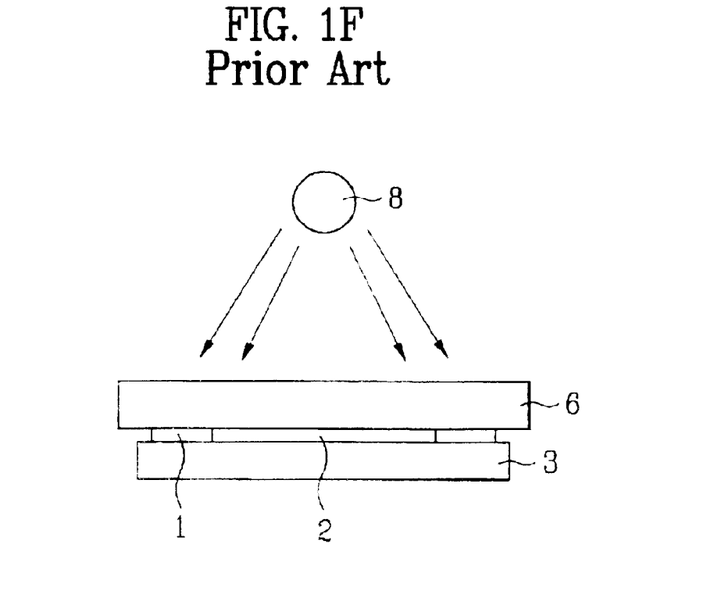

Referring to FIG. 1F, the pre-bonded first and second glass substrates 3 and 6 are taken out of the vacuum container 'C', and a UV ray is directed to the sealant to set the sealant 1, thereby completing the fabrication process.

However, the foregoing related art method for fabricating an LCD having the liquid crystal dropping method applied thereto has the following problems.

First, the sealant coating and liquid crystal dropping on the same substrate lead to require much fabrication time period before the two substrates are bonded.

Second, as the sealant is coated and the liquid crystal is dropped on the first substrate while the second substrate sits idle, there is an imbalance of a fabrication process time between the first and second substrates, resulting in an ineffective operation of the production line.

Third, because the sealant is coated and the liquid crystal is dropped on the first substrate, the first substrate can not be cleaned at an ultrasonic cleaner (USC). Therefore, as the sealant that will bond the two substrates should not be removed undesirable particles also cannot be removed which may cause defective contact of the sealant in the bonding.

Fourth, as the two substrates are aligned such that the either liquid crystal or the sealant comes into contact with the second substrate, the orientation film on the second substrate may become damaged, thereby causing poor picture quality. Further, if the upper and lower stages are not level, the first and second substrates may not fully contact each other and scratch the opposite substrate, or make the sealant uneven.

Fifth, aligning the two substrates by varying only a distance therebetween creates an inaccurate alignment of the two substrates.

SUMMARY OF THE INVENTION

Accordingly, the present invention is directed to a liquid crystal display (LCD) and a method for fabricating a liquid crystal display that substantially obviates one or more of the problems due to limitations and disadvantages of the related art.

An advantage of the present invention is the provision of a method for fabricating an LCD incorporating a liquid crystal dropping method that reduces the time required to fabricate an LCD and increases the efficiency, to improve productivity of the LCD fabrication.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating an LCD includes steps of loading a first substrate having liquid crystal dropped thereon and a second substrate having sealant coated thereon on a bonding chamber, aligning the first and second substrates, bonding the first and second substrates with a varied pressure applied thereto, and unloading the bonded first and second substrates.

In one aspect of the present invention, the step of loading may include the steps of holding the first and second substrates to lower and upper stages, respectively, in the bonding chamber, positioning a substrate receiver in the bonding chamber under the second substrate held to the upper stage, evacuating the bonding chamber, and electrostatically securing the first and second substrates to the lower and upper stages, respectively.

In the present aspect of the invention, the step of evacuating may include performing a first evacuation after the first and second substrates are held to the lower and upper stages, respectively, in the bonding chamber and then performing a second evacuation after the substrate receiver is positioned under and contacts the second substrate held to the upper stage.

In one aspect of the present invention, the step of aligning may include the step of successively aligning rough marks and fine marks, wherein the aligning is performed by moving the lower stage and alignment of the rough and fine marks is determined using separate cameras.

In the present aspect of the invention, alignment of the rough and fine marks may be made by focusing on a central region between the first and second glass substrates. Alternatively, alignment of the rough and fine marks may be made by alternately focusing on marks formed on the first and second glass substrates.

In the present aspect of the invention, alignment of the rough marks may be made by providing a 0.4 mm–0.9 mm gap between the first glass substrate and the second glass substrate and alignment of the fine marks may be made by providing a 0.1 mm–0.4 mm gap between the first glass substrate and the second glass substrate.

In the present aspect of the invention, alignment of the fine marks may be made by bringing liquid crystal dispensed on the first glass substrate into contact with the second glass substrate. Additionally, a plurality of the rough and fine marks may be formed between panels and/or in a periphery of the substrate.

In one aspect of the present invention, the step of bonding may include a step varying a pressure applied to the substrates at least twice.

In one aspect of the present invention the step of unloading may include the steps of loading an unbonded first or second substrate to the upper or lower stage, and unloading the bonded substrates.

In one aspect of the present invention, the liquid crystal is dispensed, and the sealant is coated, on the first substrate.

The method for fabricating the LCD may further include a step of spreading liquid crystal toward the sealant before or after the unloading.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 2:
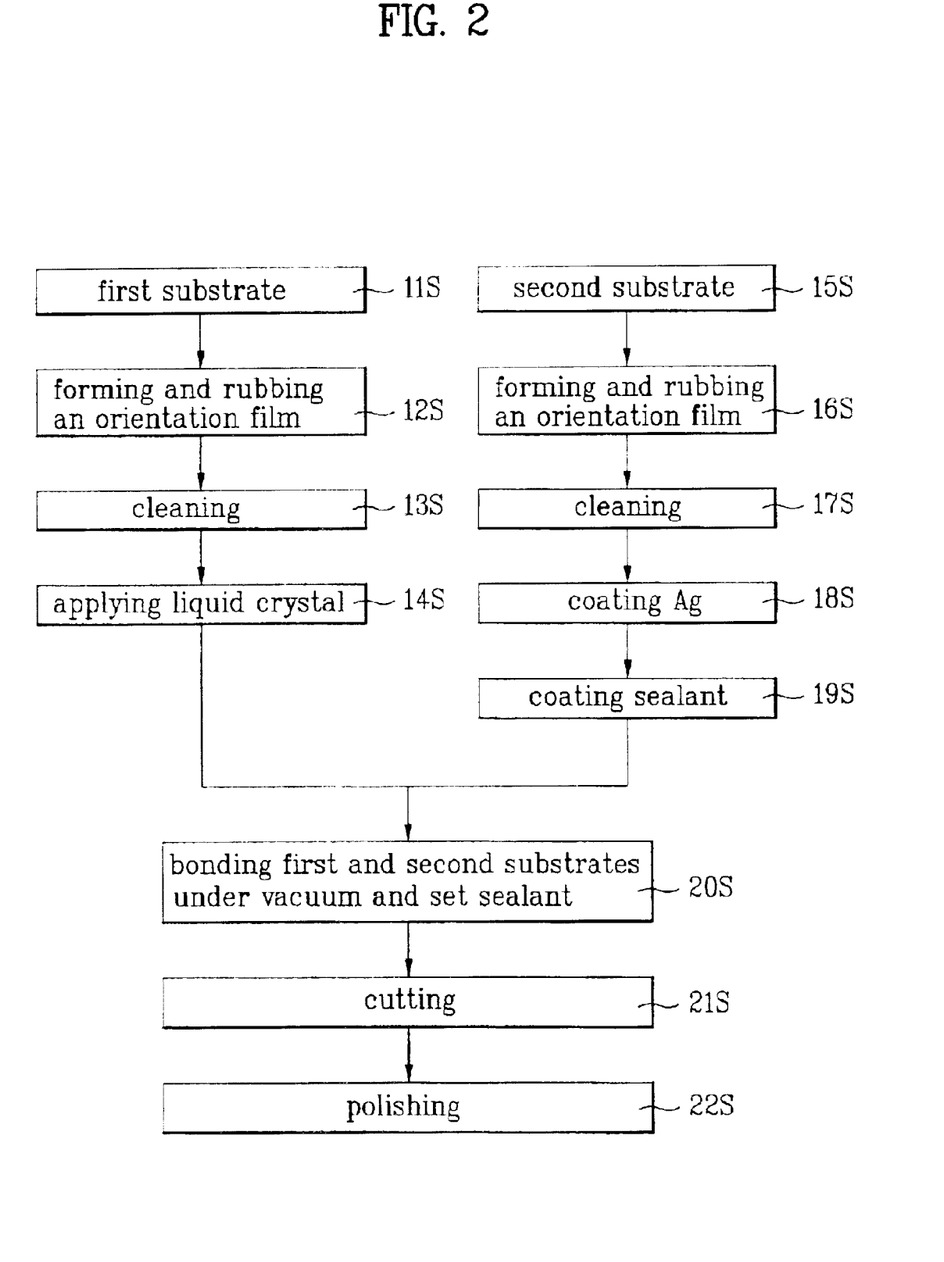
FIG. 2 schematically illustrates a flow chart showing the steps of a method for fabricating an LCD in accordance with an embodiment of the present invention.

FIG. 2 schematically illustrates a flow chart showing the steps of a method for fabricating an LCD in accordance with an embodiment of the present invention while FIGS. 3A–3G schematically illustrate steps of a method for fabricating an LCD in accordance with an embodiment of the present invention.

Referring to FIG. 2, a plurality of panels may be designed on a first glass substrate 11 and a thin film transistor array is formed on each panel (11S), and a first orientation or alignment film is formed on an entire surface of the first glass substrate 11. Then a rubbing process (12S) is performed. Instead of the rubbing process, a UV alignment process may be performed.

A plurality of panels are designed on a second glass substrate 13 corresponding to the panels on the first glass substrate 11, to form a color filter array on each panel (15S). The color filter array includes such elements as a black matrix layer, a color filter layer, and a common electrode. A second orientation or alignment film is formed on an entire surface of the second substrate 13 and the second orientation film undergoes a rubbing process (16S) similar to the first orientation film.

The first and second glass substrates 11 and 13 thus formed are cleaned, respectively (13S and 17S).

Figure 3A:
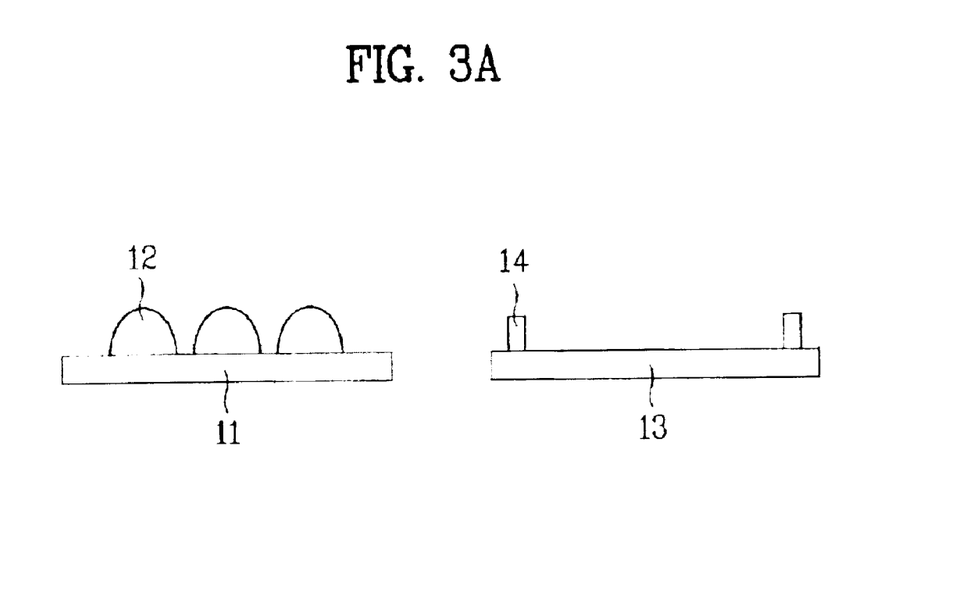
FIGS. 3A–3G schematically illustrate steps of a method for fabricating an LCD in accordance with an embodiment of the present invention.

Referring to FIG. 3A, liquid crystal 12 is dispensed or applied to the first glass substrate 11 which has been cleaned (14S). Silver (Ag) dots are formed on the cleaned second glass substrate 13 (18S), and a sealant 14 is coated thereon (19S).

The first and second glass substrates 11 and 13 are loaded in a vacuum bonding chamber 10, and bonded to spread the applied liquid crystal between the first and second substrates uniformly, and then, the sealant is hardened (20S).

The bonded first and second glass substrates 11 and 13 are cut into a plurality of individual panels (21S). Although a plurality of individual panels may be cut from any glass substrate, a single panel may also be formed to maximize the size of the display. Subsequently, each panel is then polished and inspected (S22).

Figure 4:
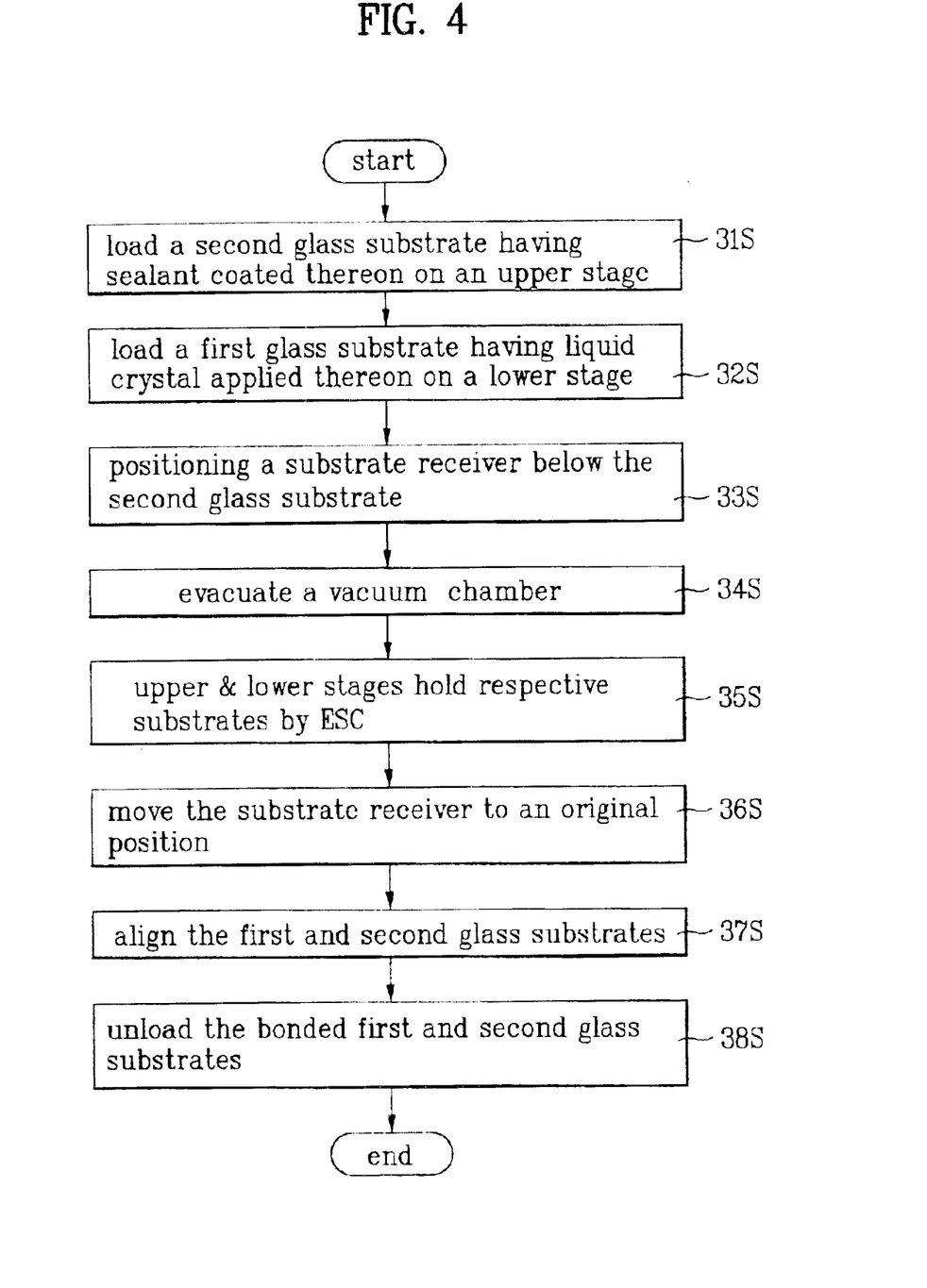
FIG. 4 illustrates a flow chart showing the steps of bonding in accordance with an embodiment of the present invention.

The bonding process will be explained in more detail. FIG. 4 illustrates a flowchart showing the bonding steps of the present invention.

The bonding process may include the steps of loading the two substrates into the vacuum bonding chamber, bonding the two substrates together, and unloading the bonded substrates from the vacuum bonding chamber.

Before loading the substrates, the second glass substrate 13 having the sealant 14 coated thereon may be cleaned using, for example, an ultra sonic cleaner (USC) to remove undesirable contaminant particles formed during fabrication. Since the second glass substrate 13 is coated by the sealant and the Ag dots, and no liquid crystal has been dispensed thereon, the second glass substrate 13 may be cleaned.

Figure 3B:
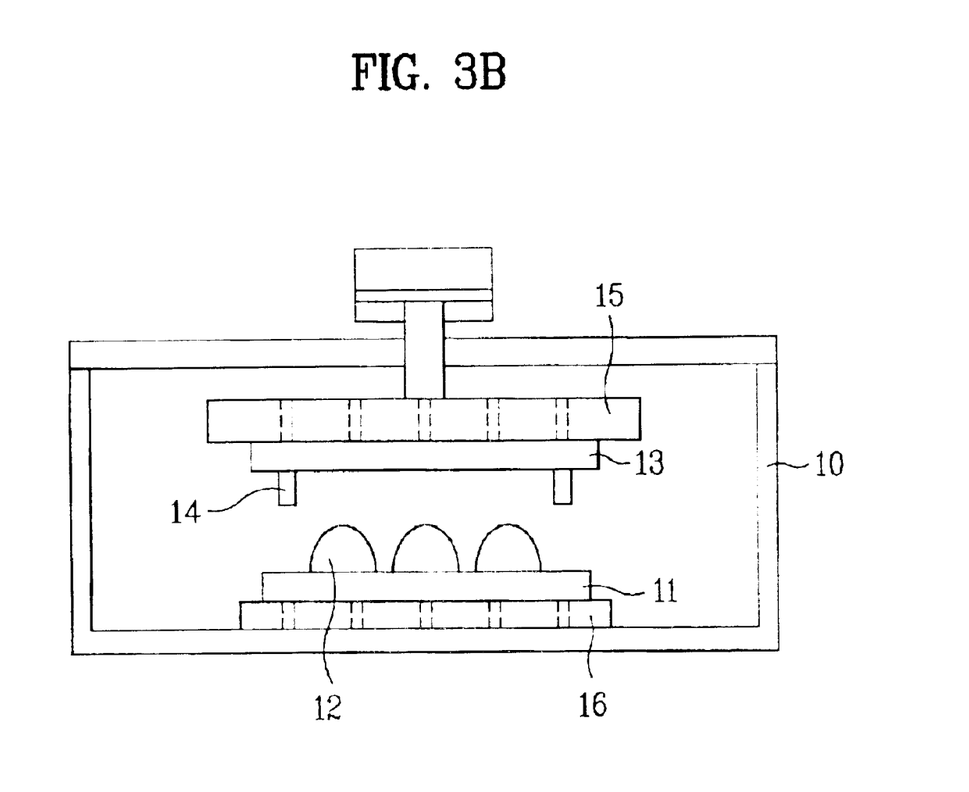

Referring to FIG. 3B, in the loading step, the second glass substrate 13 having the sealant 14 coated thereon and facing in a downward direction, is held to an upper stage 15 by, for example, a vacuum or electrostatic chuck provided in the vacuum bonding chamber 10 (31S). Before the second glass substrate 13 is loaded in the bonding chamber 10, the second glass substrate 13 may be flipped over so that the surface with the sealant 14 will face in a downward direction, as will be explained in greater detail below.

In flipping over the second glass substrate 13, having the sealant 14 coated thereon, a loader of a robot (not shown) may hold the substrate such that the sealant 14 is facing in a downward direction as it is brought in the vacuum bonding chamber 10. Next, the upper stage 15 in the vacuum bonding chamber 10 may be moved vertically downward to contact and hold the second glass substrate 13, and then may be moved vertically upward. In one aspect of the present invention, the second glass substrate 13 may be held to the upper stage 15 using a vacuum chuck, electrostatic charge (ESC), or any other suitable holding technique.

The loader of the robot is then moved out of the vacuum bonding chamber 10 and the first glass substrate 11 is arranged over the lower stage 16 by the loader of the robot.

Although it has been explained that the liquid crystal 12 is dispensed on the first glass substrate 11 having the thin film transistor array and the sealant is coated on the second glass substrate 13, the sealant may alternatively be coated on the first glass substrate 11 while the liquid crystal may alternatively be dispensed on the second substrate. Moreover, the sealant may be applied to both substrates. Further, the liquid crystal may be dispensed, or the sealant coated, on either of the two glass substrates as long as the substrate with the liquid crystal material dispensed thereon is located on the lower stage and the other substrate is located on the upper stage.

After the first and second substrates are held by vacuum to the lower and upper stage, the first and second substrates may be aligned.

Next, a substrate receiver (not shown) is contacted with a bottom surface of the second glass substrate 13 (33S) by positioning the substrate receiver under the second glass substrate 13 and moving the upper stage down, or the substrate receiver up, or both, until the second glass substrate 13 contacts the substrate receiver.

The substrate receiver is positioned below the second glass substrate 13, to prevent the second glass substrate held to the upper stage from becoming detached from the upper stage due to a reduction in a vacuum force present within the upper stage when the vacuum pressure in the bonding chamber becomes higher than the vacuum force within the upper and lower stages.

Accordingly, the second glass substrate 13, held to the upper stage may be arranged on the substrate receiver before or during the creation of a vacuum in the vacuum bonding chamber. Alternatively, the upper stage holding the second glass substrate and the substrate receiver may be brought within a predetermined distance of each other so that the second glass substrate 13 may be safely arranged on the substrate receiver from the upper stage when the chamber is evacuated. Moreover, means for fastening the substrates may be provided additionally as air flow in the chamber, capable of shaking the substrates, may occur when evacuation of the vacuum bonding chamber is initiated.

The vacuum within the vacuum bonding chamber 10 may have a pressure in a first range of about $1.0 \times 10^{-3}$ Pa to 1 Pa or a second range of about $1.1 \times 10^{-3}$ Pa to $10^2$ Pa. The first range may be especially applicable for an in-plane switching (IPS) mode LCD and the second range may be especially useful for a twisted nematic (TN) mode LCD. Another type of LCD called a vertical alignment (VA) mode LCD may also use these ranges.

Evacuation of the vacuum bonding chamber 10 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage holds the substrate, the vacuum bonding chamber is evacuated a second time. The second evacuation is faster than the first evacuation and the vacuum pressure created by the first evacuation is not greater than the vacuum pressure created within the upper stage.

The aforementioned two stage evacuation process may prevent deformation or shaking of the substrates when the vacuum bonding chamber is rapidly evacuated.

Alternatively, after the substrates are held to their respective stages and the chamber door is closed, the evacuation may be implemented in a single step at a fixed rate. In addition, the substrate receiver may be positioned below the second substrate 13 held to the upper stage 15 during the evacuation. Before the vacuum pressure in the vacuum bonding chamber becomes higher than the vacuum holding force of the upper stage it is required that the substrate receiver be in contact with the second glass substrate 13.

Once the vacuum bonding chamber 10 is evacuated to a final vacuum pressure, the first and second glass substrates 11 and 13, respectively, are electrostatically secured to their respective stages using an electrostatic chuck (ESC) (35S) and the substrate receiver may be brought to its original position (36S). Accordingly, the loading process is completed.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1–1 KV may be applied to the plate electrodes. When the substrate contains no conductive layer, about 3–4 KV may be applied to the plate electrodes. An elastic sheet may be optionally be provided to the upper stage.

After the upper stage 15 is moved down to bring the second glass substrate 13 closer to the first glass substrate 11, the first and second glass substrate 11 and 13 are aligned (37S) in an alignment method, as will be explained in greater detail below.

Figure 5:
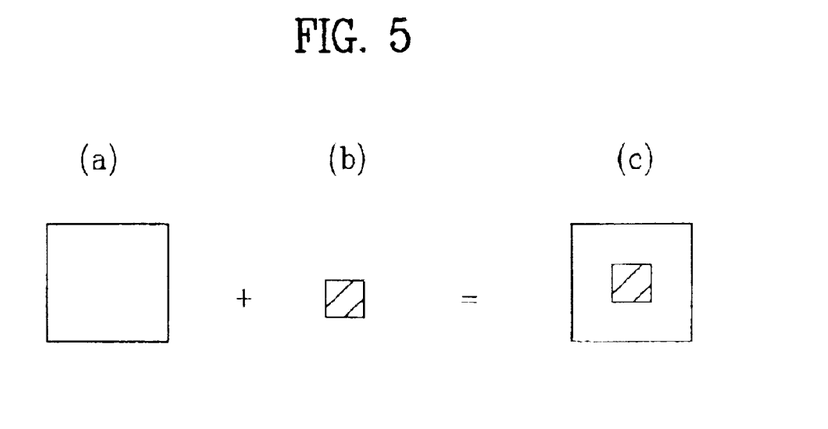
FIGS. 5A–5C illustrate an exemplary rough mark alignment method in accordance with an embodiment of the present invention.
Figure 6:
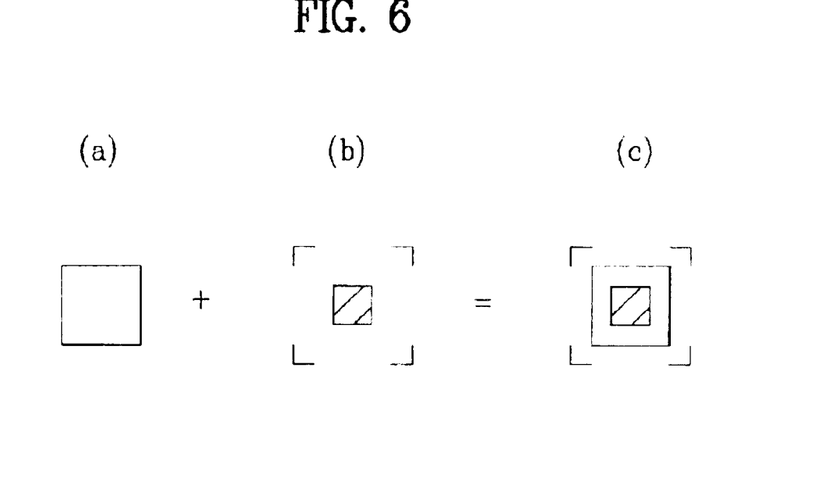
FIGS. 6A–6C illustrate an exemplary fine mark alignment method in accordance with an embodiment of the present invention.
Figure 7:
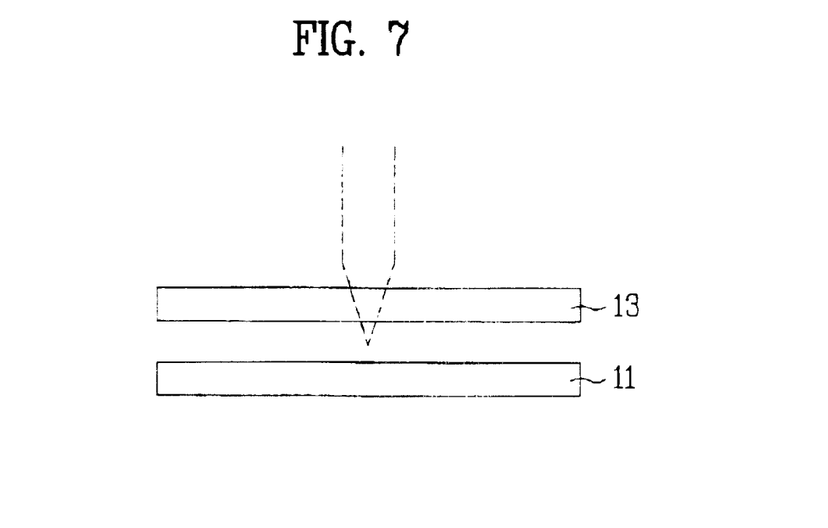
FIG. 7 illustrates a camera focusing position used in an alignment method in accordance with an embodiment of the present invention.

FIGS. 5A–5C illustrate an exemplary rough mark alignment method in accordance with an embodiment of the present invention, FIGS. 6A–6C illustrate a fine mark alignment method in accordance with an embodiment of the present invention, and FIG. 7 illustrates a camera focusing position used in an alignment method in accordance with an embodiment of the present invention.

Referring to FIGS. 5A–5B and 6A–6B, the first glass substrate 11 and the second glass substrate 13 include rough alignment marks measuring approximately 3 μm in size (FIGS. 5A–5C) and fine alignment marks measuring approximately 0.3 μm in size (FIGS. 6A–6C). The first glass substrate 11 includes a least one rough alignment mark as shown in FIG. 5A and at least one fine alignment mark as shown in FIG. 6A. The second glass substrate 13 includes at least one rough alignment mark as shown in FIG. 5B and at least one fine alignment mark as shown in FIG. 6B.

In one aspect of the present invention, different cameras may be used to align the rough marks and the fine marks. Alternatively, a single camera may be used to align both the rough marks and the fine marks.

Referring to FIG. 7, the cameras used to align the rough and fine marks may be focused on a central part between the first glass substrate 11 and the second glass substrate 13.

Figure 3C:
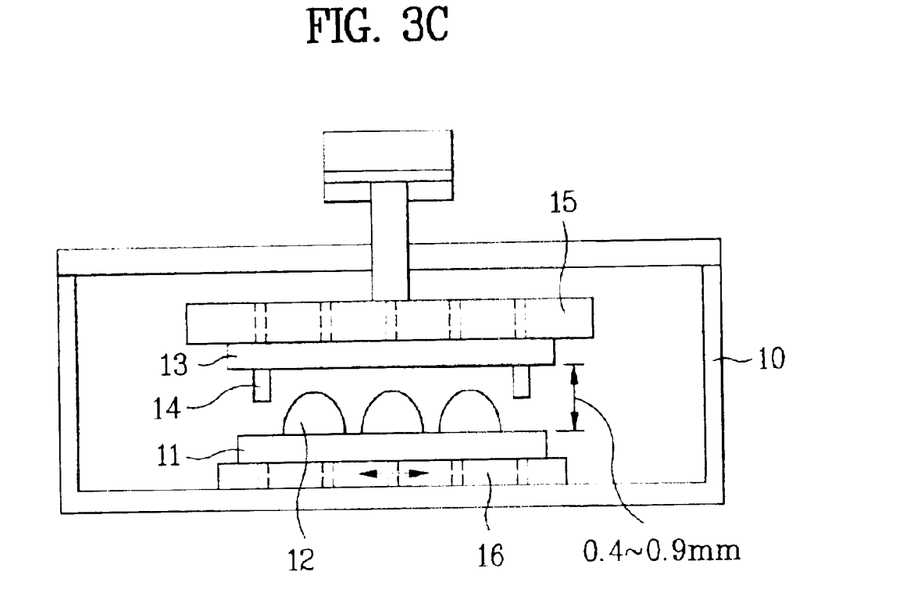

Referring to FIG. 3C, the upper stage 15 is moved down a first time such that the second glass substrate 13 does not touch the liquid crystal dispensed on the first glass substrate and a gap between the first glass substrate 11 and the second glass substrate 13 is in a range of 0.4 mm–0.9 mm, for example 0.6 mm. Subsequently, the first glass substrate 11 is roughly aligned with the second glass substrate 13 such that the rough marks on the second glass substrate 13 may be located within the rough marks on the first glass substrate 11. In performing the rough alignment an area of approximately 3.0 mm may be searched in order to determine the positions of the rough and fine alignment marks.

Figure 3D:
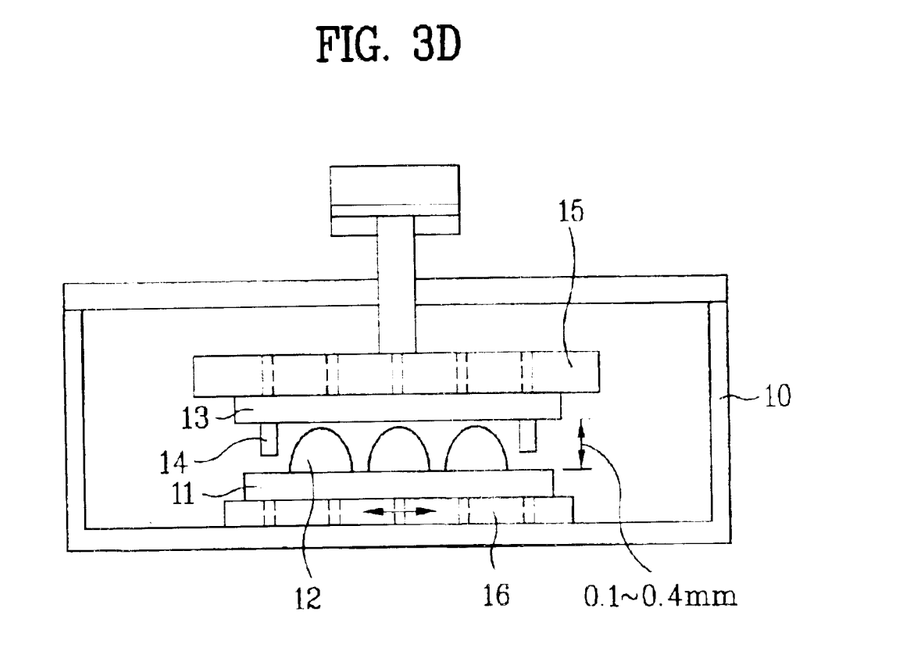

Referring to FIG. 3D, the upper stage 15 is moved down a second time such that a gap between the first glass substrate 11 and the second glass substrate 13 is in a range of 0.1 mm–0.4 mm, for example, 0.2 mm. Subsequently, the first glass substrate 11 is finely aligned with the second glass substrate 13 such that the fine mark on the second glass substrate 13 is accurately located within the fine mark on the first glass substrate 11. In performing the fine alignment an area of approximately 0.2 mm may be searched in order to determine the positions of the rough and fine alignment marks. Further, an alignment tolerance of approximately 0.1 μm may be achieved as a result of aligning the first and second substrates. During the step of finely aligning the first and second glass substrates, the liquid crystal 12 dispensed on the first glass substrate 11 may contact the second glass substrate 13.

Since the upper stage 15 is movable in vertical, e.g., up and down, directions and the lower stage is movable in horizontal, e.g., X, and Y, directions, the lower stage 16 may be moved horizontally to align the two substrates.

During alignment of the rough and fine marks, the cameras may be provided above or below the upper or lower surfaces of the first or second substrates. In one aspect of the present invention, the cameras used to locate the alignment marks may be positioned outside the vacuum bonding chamber. Accordingly, the cameras may be used to view rough and fine alignment marks on the first and second substrates through one or more windows provided in top and bottom walls of the vacuum chamber, as required.

In another aspect of the present invention, the windows, through which the alignment marks are viewed by the cameras, may be provided within recessed cavities formed in the top and bottom walls of the vacuum chamber. Accordingly, in the present aspect of the invention, a single camera may be used to view alignment marks formed on the upper and lower substrates by moving the cameras up and down within their respective cavities. Alternately, a single, stationary camera may be used to view alignment marks on a single substrate. Accordingly, movement of the cameras is not required.

In a first exemplary aligning process, a central part between the alignment marks on the second glass substrate 13 and the alignment marks on the first glass substrate 11 may be focused on using the cameras. In a second example, a focal point of the cameras may be adjusted to focus on alignment marks formed on the on the second glass substrate 13 and then to focus on alignment marks formed on the first glass substrate 11, thereby improving an alignment accuracy over that of the aforementioned first example.

Figure 8:
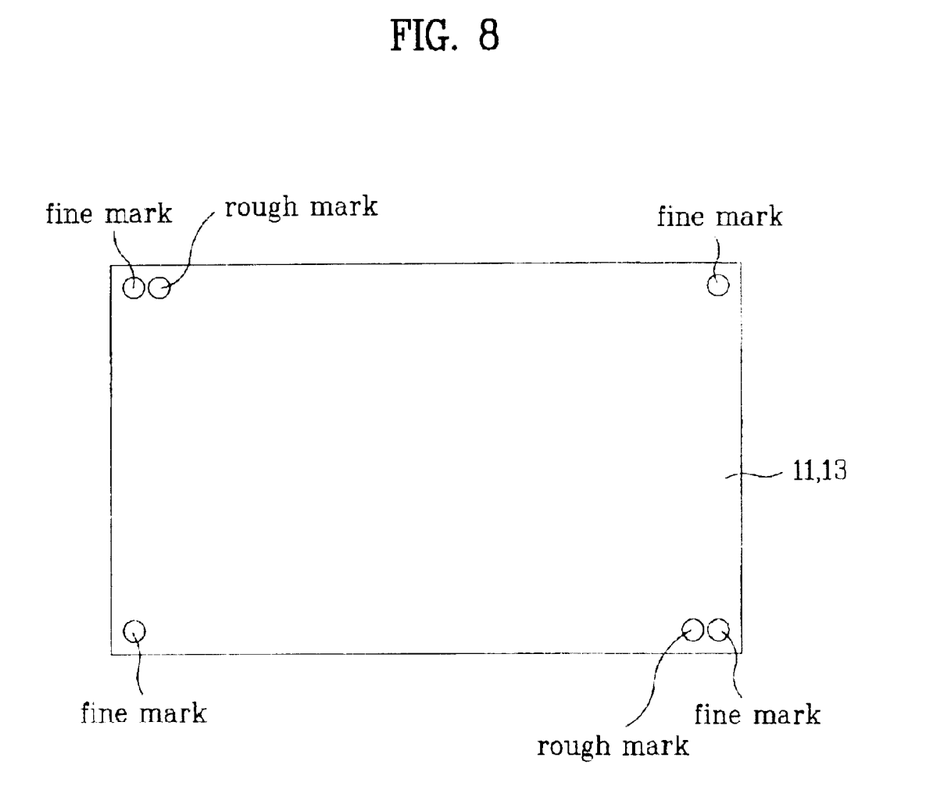
FIG. 8 illustrates an exemplary layout of rough and fine marks used in an alignment method in accordance with an embodiment of the present invention.

FIG. 8 illustrates an exemplary layout of rough and fine marks used in an alignment method in accordance with an embodiment of the present invention.

Referring to FIG. 8, at least four rough and fine marks may be formed on the first and second glass substrates 11 and 13. Alignment marks on one substrate correspond in location to alignment marks formed on another substrate. To improve alignment accuracy, the number of alignment marks may be increased as the size of the glass substrate increases. The rough marks and the fine marks may be formed in regions between panels which are to be cut, or in a periphery region of the substrate outside of where the plurality of panels are formed.

FIGS. 5C and 6C illustrate times the rough marks and the fine marks are aligned, and the first glass substrate 11 are aligned with the second glass substrate 13 by employing different cameras in alignment of the rough marks and the fine marks, the alignment can be made more faster and accurately.

Figure 3E:
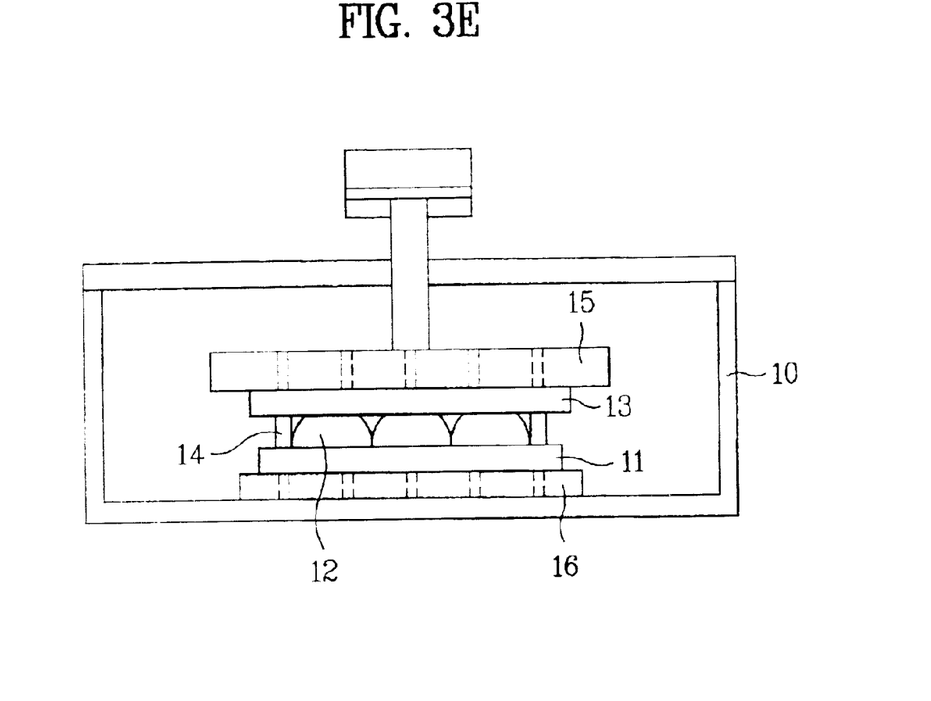
Figure 3F:
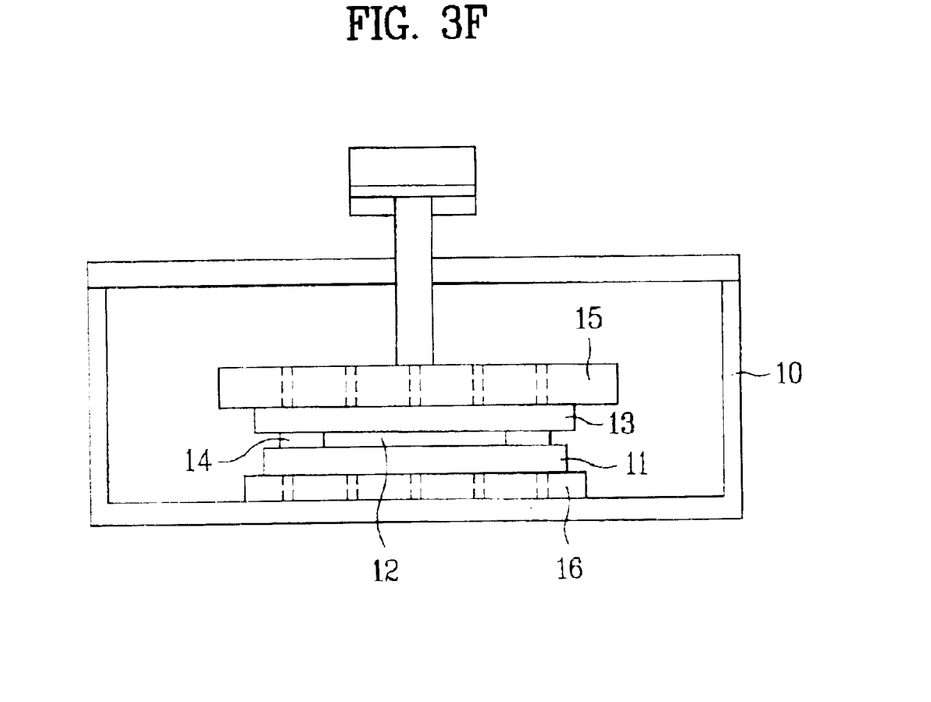

Referring to FIGS. 3E and 3F, after the two substrates are aligned, the upper stage 15 is moved down and a pressure is applied to the first and second glass substrates 11 and 13, thereby bonding the two substrates together (38S). The first and second glass substrates 11 and 13 are bonded together by moving either the upper stage 15 or the lower stage 16 in a vertical direction, while varying speeds and the pressures of the upper and lower stages. Until the time when the liquid crystal 12 on the first glass substrate 11 comes into initial contact with the second glass substrate 13 or when the seal on the second glass substrate 13 come into initial contact with the first glass substrate 11, the stages are moved at a fixed speed or fixed pressure. After the time of initial contact, the pressure is increased gradually from the fixed pressure to a final pressure. Accordingly the time of initial contact is sensed by a load cell fitted to a shaft of the upper or lower stages. The two glass substrates 11 and 13 may, for example, be pressed at a first pressure of 0.1 ton at the initial time of contact, a second pressure of 0.3 ton at a first intermediate stage, a third pressure of 0.4 ton at a second intermediate stage, and a fourth pressure of 0.5 ton at a final stage (see FIG. 3F).

Although it is illustrated that the upper stage presses down onto the substrates by means of one shaft, a plurality of shafts may independently apply and control pressure using individual load cells fitted thereto. If the lower stage and the upper stage are not level or fail to be pressed uniformly, a predetermined number of shafts may be selectively activated to apply lower or higher pressures to the substrates, thereby providing uniform bonding of the sealant.

Figure 3G:
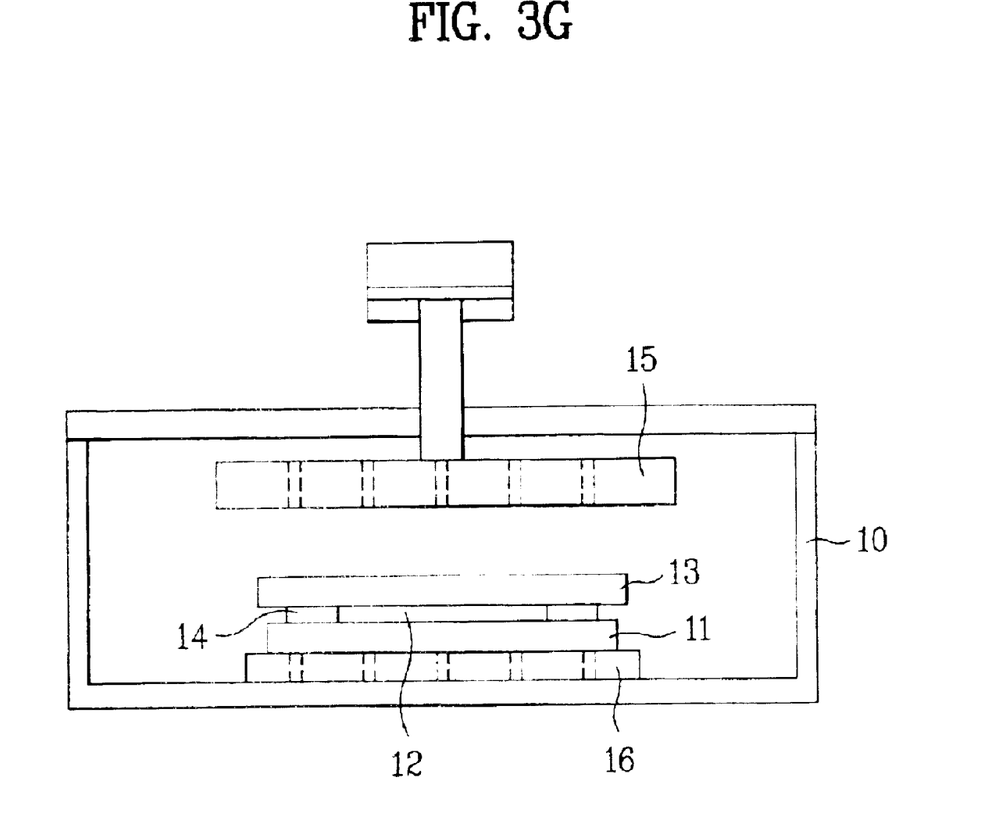

Referring to FIG. 3G, after reaching the final stage, applying the fourth pressure, and bonding the two substrates, the ESC is turned off and the upper stage 15 is raised upward and separates from the bonded glass substrates 11 and 13.

Next, the bonded substrates are unloaded (39S). Accordingly, after the upper stage is raised to a final raised position, the bonded glass substrates may be unloaded using the loader of the robot. Alternatively, the bonded glass substrates may be held by the upper stage during its ascent to its final raised position wherein the loader of the robot unloads the first and second glass substrates 11 and 13 from the upper stage 16. The bonded substrates may be held to the upper stage by a vacuum or an electrostatic charge.

In order to shorten the fabrication time period, an unbonded first glass substrate 11 or second glass substrate 13 may be loaded onto a stage while the bonded substrates are unloaded from a stage. Accordingly, an unbonded second glass substrate 13 may be brought to the upper stage 15 by means of the loader of the robot and held to the upper stage by a vacuum or an electrostatic charge while the bonded first and second glass substrates may be unloaded from the lower stage 16. Alternatively, an unbonded first glass substrate 11 may be brought to the lower stage 16 by means of the loader robot while the bonded first and second glass substrates held by the upper stage 15 may be unloaded.

A liquid crystal spreading process may be provided before or after the bonded substrates are unloaded. Accordingly, the liquid crystal spreading process spreads the liquid crystal in the gap between the bonded substrates toward the sealant in the event the liquid crystal does not spread sufficiently toward the sealant before unloading. The liquid crystal spreading process may be carried out for at least 10 minutes under the atmospheric or a vacuum pressure.

As has been explained, the method for fabricating LCDs of the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, dispensing liquid crystal on the first substrate and coating the sealant and the Ag dots on the second substrate prevents the sealant from becoming contaminated with particles as the substrate coated by the sealant may be cleaned by a USC just prior to bonding.

Fourth, positioning the substrate receiver under the substrate and evacuation of the vacuum bonding chamber permits the substrate held to the upper stage from falling and thereby breaking.

Fifth, adjustment of the gap between the first and second glass substrates and the use of cameras during the alignment of rough and fine marks permit fast and accurate alignment of the first and second substrates.

Sixth, sensing the time when the two substrates initially contact each other and varying the pressure applied in bonding the two substrates together minimizes damage to the orientation film caused by the liquid crystal.

Sixth, since the upper stage presses the substrate down by means of a plurality of shafts, each of which capable of applying pressure independently, uniform bonding of the sealant can be achieved by independently applying a lower or higher pressures by predetermined shafts when the lower stage and the upper stage are not level or fail to bond to the sealant uniformly.

Eighth, the simultaneous loading and unloading of unbonded and bonded substrates shortens a fabrication time of the LCD.

Ninth, the two staged evacuation of the vacuum bonding chamber prevents deformation of the substrate and air flow in the chamber caused by sudden pressure changes.

Tenth, the liquid crystal spreading process shortens a fabrication time period of the LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating an LCD, comprising:
   loading a first substrate having liquid crystal dispensed thereon and a second substrate into a bonding chamber, wherein sealant is formed on one of the first and second substrates;
   aligning the first and second substrates in a state in which the sealant contacts only one of the first and second substrates, the aligning including successively performing a rough alignment and a fine alignment, wherein a gap between the first and second substrates during the rough alignment is different from a gap between the first and second substrates during the fine aliment;
   after the aligning is complete, causing the sealant to contact both the first and second substrates to thereby bond the first and second substrates using an applied pressure; and
   unloading the bonded first and second substrates.

2. The method as claimed in claim 1, wherein the step of loading includes:
   holding the second substrate to an upper stage in the bonding chamber, and the first substrate to a lower stage,
   positioning a substrate receiver in the bonding chamber with a bottom surface of the second substrate held to the upper stage,
   evacuating the bonding chamber, and
   electrostatically securing the first and second substrates to the lower and upper stages, respectively.

3. The method as claimed in claim 2, wherein the step of evacuating includes:
   performing a first evacuation after the first substrate and the second substrate are held to the lower and upper stages, respectively, in the bonding chamber; and
   performing a second evacuation after the substrate receiver is positioned under the second substrate.

4. The method as claimed in claim 2, further comprising coating the first substrate with a sealant.

5. The method as claimed in claim 2, further comprising coating the second substrate with a sealant.

6. The method as claimed in claim 2, further comprising varying the applied pressure in the step of bonding at least twice.

7. The method as claimed in claim 1, wherein the step of unloading includes:
   loading one of an unbonded the first or second substrate to one of the upper or the lower stage; and
   unloading the bonded first and second substrates.

8. The method as claimed in claim 1, further comprising spreading the liquid crystal toward the sealant before or after unloading the bonded first and second substrates.

9. The method as claimed in claim 1, further comprising:
   forming at least one alignment mark on at least one of the first and second substrates, wherein the alignment marks are selected from the group consisting of rough marks and fine marks; and
   aligning the at least one alignment mark on the first and second substrates.

10. The method as claimed in claim 9, further comprising aligning the alignment marks by moving the lower stage.

11. The method as claimed in claim 9, wherein
    the forming includes forming at least one rough alignment mark and at least one fine alignment mark on at least one of the first and second substrates; and
    the aligning includes aligning the rough and fine alignment marks in succession.

12. The method as claimed in claim 11, further comprising aligning the rough alignment marks and fine alignment marks using separate cameras.

13. The method as claimed in claim 11, further comprising aligning the rough alignment marks and fine alignment marks using a single camera.

14. The method as claimed in claim 11, further comprising aligning the rough alignment marks and the fine alignment marks by focusing on a central part between the first glass substrate and the second glass substrate.

15. The method as claimed in claim 11, further comprising aligning the rough alignment marks and the fine alignment marks by alternately focusing on the alignment marks formed on the first glass substrate and on the alignment marks formed on the second glass substrate.

16. The method as claimed in claim 11, further comprising aligning the rough alignment marks by providing a 0.4 mm–0.9 mm gap between the first glass substrate and the second glass substrate.

17. The method as claimed in claim 11, further comprising aligning the fine alignment marks by providing a 0.1 mm–0.4 mm gap between the first glass substrate and the second glass substrate.

18. The method as claimed in claim 11, further comprising the aligning the fine alignment marks by contacting the liquid crystal with the second substrate.

19. The method as claimed in claim 9, further comprising a plurality of panel regions formed within the first and second substrates, wherein the alignment marks are formed in regions between the panel regions.

20. The method as claimed in claim 9, further comprising a plurality of panel regions formed within the first and second substrates, wherein the alignment marks are formed in a periphery region of the substrate.

21. A method for fabricating an LCD, comprising:
    providing a first substrate having liquid crystal dispensed thereon;
    providing a second substrate having a sealant coated thereon;
    providing a plurality of alignment marks on the first and second substrates, wherein an alignment mark on one substrate corresponds in location to another alignment mark on another substrate;
    aligning the alignment marks on the first and second substrates in a state in which the sealant contacts only the second substrate, the aligning including successively performing a rough alignment and a fine alignment, wherein a gap between the first and second substrates during the rough alignment is different from a gap between the first and second substrates during the fine alignment; and
    after the aligning is complete, causing the sealant to contact both the first and second substrates to thereby bond the aligned first and second substrates.

* * * * *